(12) United States Patent
Huang et al.

(10) Patent No.: US 11,876,654 B2
(45) Date of Patent: Jan. 16, 2024

(54) METHODS AND APPARATUS FOR UNIFIED CODEBOOKS FOR ORTHOGONAL SEQUENCE TRANSMISSION

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Hwan Joon Kwon, San Diego, CA (US); Krishna Kiran Mukkavilli, San Diego, CA (US); Tingfang Ji, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/235,915

(22) Filed: Apr. 20, 2021

(65) Prior Publication Data

US 2021/0336829 A1 Oct. 28, 2021

Related U.S. Application Data

(60) Provisional application No. 63/014,030, filed on Apr. 22, 2020.

(51) Int. Cl.
*H04L 27/26* (2006.01)
*H04B 7/0456* (2017.01)
(Continued)

(52) U.S. Cl.
CPC ..... *H04L 27/26035* (2021.01); *H04B 7/0456* (2013.01); *H04L 27/2607* (2013.01);
(Continued)

(58) Field of Classification Search
None
See application file for complete search history.

(56) References Cited

U.S. PATENT DOCUMENTS

| 8,897,393 B1 | 11/2014 | Zhang et al. | |
|---|---|---|---|
| 2011/0064156 A1* | 3/2011 | Kim | H04B 7/0469 |
| | | | 375/267 |

(Continued)

FOREIGN PATENT DOCUMENTS

WO 2008086239 A1 7/2008

OTHER PUBLICATIONS

International Search Report and Written Opinion—PCT/US2021/028435—ISAEPO—dated Jul. 29, 2021.

*Primary Examiner* — Bob A Phunkulh
(74) *Attorney, Agent, or Firm* — Procopio, Cory, Hargreaves & Savitch LLP/Qualcomm Incorporated

(57) ABSTRACT

The present disclosure relates to methods and devices for wireless communication including an apparatus, e.g., a UE and/or base station. The apparatus can select one or more rows or one or more columns in a DFT matrix, the one or more rows being even-numbered rows in the DFT matrix and the one or more columns being even-numbered columns in the DFT matrix. The apparatus can also determine an orthogonal matrix based on the one or more rows or the one or more columns in the DFT matrix, the orthogonal matrix having a size of (M×N)×(M×N) with M×N rows and M×N columns. Also, the apparatus can determine a codebook based on the orthogonal matrix, the codebook including a plurality of codepoints. The apparatus can also transmit at least one signal including a first codepoint of the plurality of codepoints in the codebook.

30 Claims, 13 Drawing Sheets

(51) Int. Cl.
*H04W 72/044* (2023.01)
*H04W 72/21* (2023.01)
*H04B 7/06* (2006.01)

(52) U.S. Cl.
CPC ....... *H04W 72/0466* (2013.01); *H04W 72/21* (2023.01); *H04B 7/0639* (2013.01)

(56) References Cited

U.S. PATENT DOCUMENTS

| | | | | |
|---|---|---|---|---|
| 2013/0077704 A1* | 3/2013 | Ding | ................ | H04L 25/03898 |
| | | | | 375/267 |
| 2016/0036507 A1* | 2/2016 | Wang | ................... | H04B 7/0473 |
| | | | | 375/267 |
| 2016/0065283 A1* | 3/2016 | Liu | ..................... | H04B 7/0456 |
| | | | | 370/329 |
| 2016/0149630 A1* | 5/2016 | Liu | ..................... | H04B 7/0413 |
| | | | | 370/329 |
| 2016/0380734 A1* | 12/2016 | Wang | ................... | H04L 5/0048 |
| | | | | 370/329 |
| 2017/0026100 A1* | 1/2017 | Wang | ................... | H04B 7/0626 |
| 2018/0254815 A1* | 9/2018 | Liu | ..................... | H04B 7/0626 |
| 2018/0331740 A1* | 11/2018 | Orhan | ................. | H04B 17/327 |
| 2019/0007107 A1* | 1/2019 | Kim | ..................... | H04B 7/0456 |
| 2019/0028158 A1* | 1/2019 | Park | .................... | H04L 5/0048 |
| 2019/0238196 A1 | 8/2019 | Lei et al. | | |
| 2019/0312623 A1* | 10/2019 | Park | .................... | H04B 7/0617 |
| 2019/0312696 A1* | 10/2019 | Kim | ..................... | H04B 7/0632 |
| 2019/0341981 A1* | 11/2019 | Park | .................... | H04B 7/0417 |
| 2019/0349045 A1* | 11/2019 | Varatharaajan | ...... | H04B 7/0469 |
| 2020/0021343 A1* | 1/2020 | Liu | ........................ | H04B 7/063 |
| 2020/0022120 A1* | 1/2020 | Liu | ..................... | H04B 7/0473 |
| 2020/0136691 A1* | 4/2020 | Li | ........................ | H04B 7/0417 |
| 2020/0136704 A1* | 4/2020 | Liu | ..................... | H04B 7/0639 |
| 2021/0211166 A1* | 7/2021 | Qiang | ................. | H04B 7/0456 |

* cited by examiner

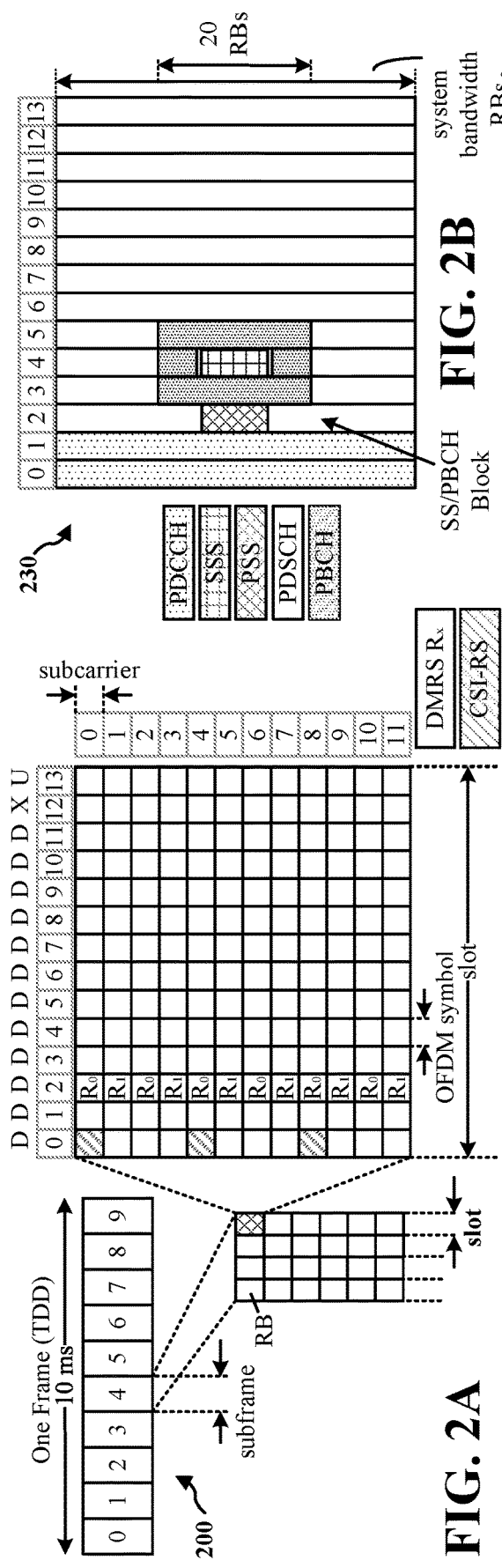
FIG. 2A
FIG. 2B
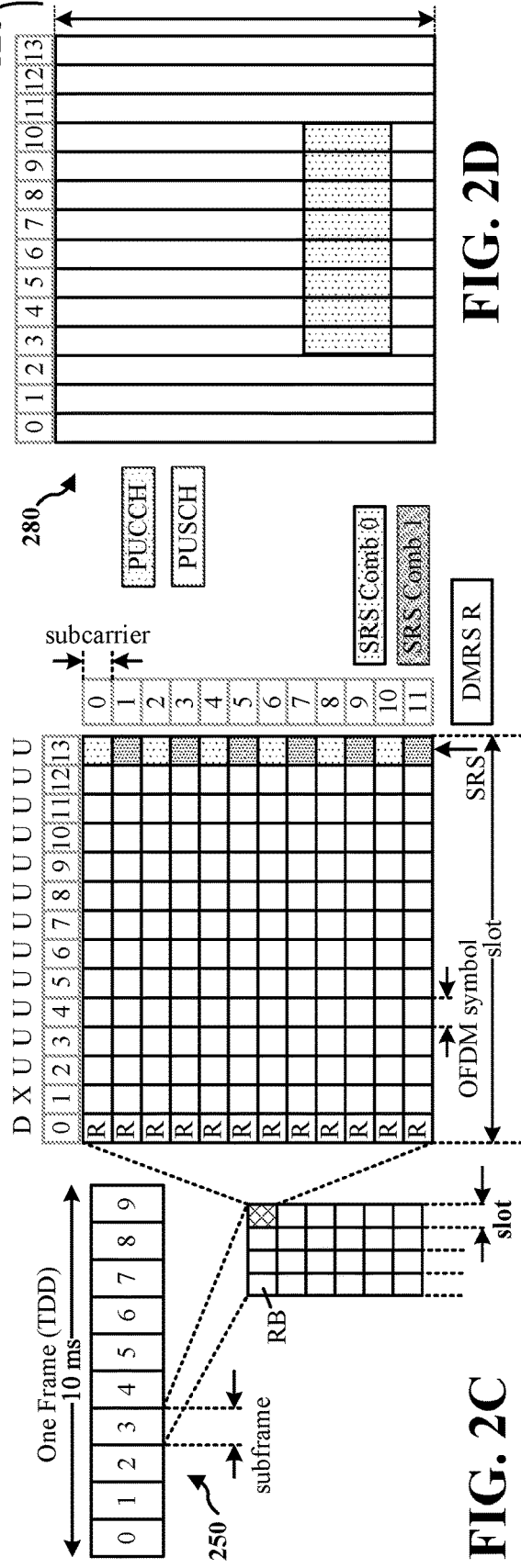
FIG. 2C
FIG. 2D

$S(M-1)e^{j2\pi(M-1)m/M}$

...

$S(l)e^{j2\pi lm/M}$ ⟵ Tone index = $l$

$$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \cdots & \vdots \\ 1 & \omega^{N-1} & \omega^{2(N-1)} & \omega^{3(N-1)} & \cdots & \omega^{(N-1)(N-1)} \end{bmatrix}$$

row $n$    Column $n$

Omega = exp(-j*2*pi/N) or exp(j*2*pi/N)

METHODS AND APPARATUS FOR UNIFIED CODEBOOKS FOR ORTHOGONAL SEQUENCE TRANSMISSION

CROSS REFERENCE TO RELATED APPLICATION(S)

This application claims the benefit of U.S. Provisional Application Ser. No. 63/014,030, entitled "METHODS AND APPARATUS FOR UNIFIED CODEBOOKS FOR ORTHOGONAL SEQUENCE TRANSMISSION" and filed on Apr. 22, 2020, which is expressly incorporated by reference herein in its entirety.

BACKGROUND

Technical Field

The present disclosure relates generally to communication systems, and more particularly, to orthogonal sequence transmission in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may select one or more rows of a plurality of rows or one or more columns of a plurality of columns in a discrete Fourier transform (DFT) matrix for a sub-matrix of the DFT matrix, the one or more rows being even-numbered rows in the DFT matrix and the one or more columns being even-numbered columns in the DFT matrix. The apparatus may also determine an orthogonal matrix based on the sub-matrix of the DFT matrix, e.g., the one or more rows or the one or more columns in the DFT matrix, where the orthogonal matrix may have a size of $(M \times N) \times (M \times N)$ with $M \times N$ rows and $M \times N$ columns. The apparatus may also generate the orthogonal matrix based on the sub-matrix of the DFT matrix, e.g., the one or more rows or one or more columns in the DFT matrix. Additionally, the apparatus may determine a codebook based on the orthogonal matrix, the codebook including a plurality of codepoints. The apparatus may also select the plurality of codepoints in the codebook from the orthogonal matrix. Moreover, the apparatus may convert a bit stream of the UCI payload to a decimal number k. The apparatus may also select the first codepoint in the codebook, where the first codepoint may be equal to the $k^{th}$ codepoint in the codebook. The apparatus may also transmit at least one signal including a first codepoint of the plurality of codepoints in the codebook to convey a K bit payload in an uplink resource.

In an aspect of the disclosure, a method, a computer-readable medium, and an apparatus are provided. The apparatus may be a base station. The apparatus may receive at least one signal to convey a K bit payload in an uplink resource, the at least one signal associated with a codebook including a plurality of codepoints. The apparatus may also concatenate the at least one signal into a vector. The apparatus may also correlate the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix. Additionally, the apparatus may generate an output for each of the plurality of codepoints in the codebook. The apparatus may also determine a first codepoint of the plurality of codepoints in the codebook, the first codepoint including a highest correlation with the at least one signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 4A and 4B are an example DFT matrix and frequency domain base sequence, respectively, in accordance with one or more techniques of the present disclosure.

DETAILED DESCRIPTION

Figure 1:
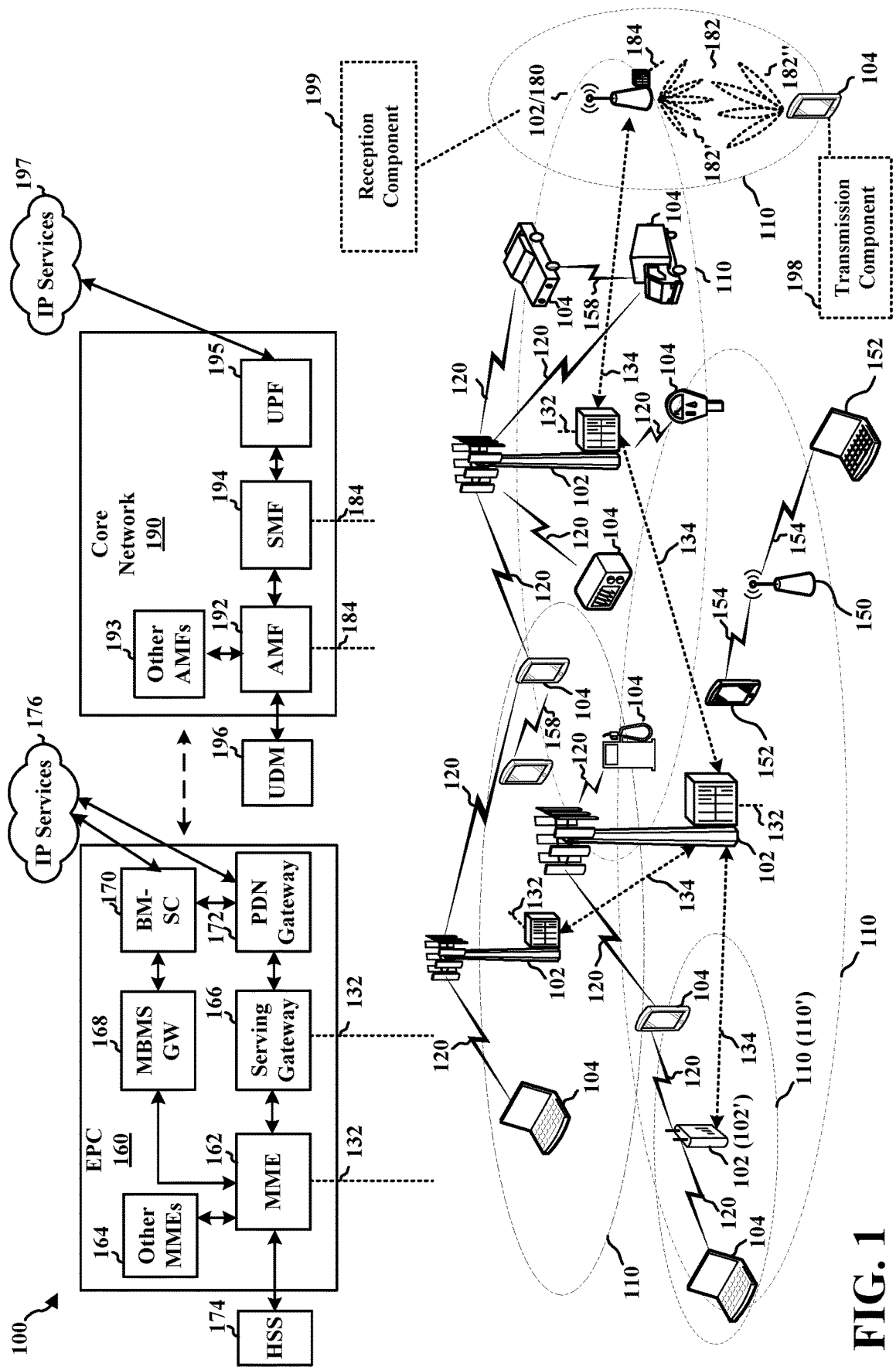
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a transmission component 198 configured to select one or more rows of a plurality of rows or one or more columns of a plurality of columns in a discrete Fourier transform (DFT) matrix for a sub-matrix of the DFT matrix, the one or more rows being even-numbered rows in the DFT matrix and the one or more columns being even-numbered columns in the DFT matrix. Transmission component 198 may also be configured to determine an orthogonal matrix based on the sub-matrix of the DFT matrix, e.g., the one or more rows or the one or more columns in the DFT matrix, where the orthogonal matrix may have a size of (M×N)×(M×N) with M×N rows and M×N columns. Transmission component 198 may also be configured to generate the orthogonal matrix based on the sub-matrix of the DFT matrix, e.g., the one or more rows or one or more columns in the DFT matrix. Transmission component 198 may also be configured to determine a codebook based on the orthogonal matrix, the codebook including a plurality of codepoints. Transmission component 198 may also be configured to select the plurality of codepoints in the codebook from the orthogonal matrix. Transmission component 198 may also be configured to convert a bit stream of the UCI payload to a decimal number k. Transmission component 198 may also be configured to select the first codepoint in the codebook, where the first codepoint may be equal to the $k^{th}$ codepoint in the codebook. Transmission component 198 may also be configured to transmit at least one signal including a first codepoint of the plurality of codepoints in the codebook.

Referring again to FIG. 1, in certain aspects, the base station 180 may include a reception component 199 configured to receive at least one signal, the at least one signal associated with a codebook including a plurality of codepoints. Reception component 199 may also be configured to concatenate the at least one signal into a vector. Reception component 199 may also be configured to correlate the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix. Reception component 199 may also be configured to generate an output for each of the plurality of codepoints in the codebook. Reception component 199 may also be configured to determine a first codepoint of the plurality of codepoints in the codebook, the first codepoint including a highest correlation with the at least one signal.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK)/negative ACK (NACK) feedback. The PUSCH carries data, and may additionally be used to carry a buffer status report (BSR), a power headroom report (PHR), and/or UCI.

Figure 3:
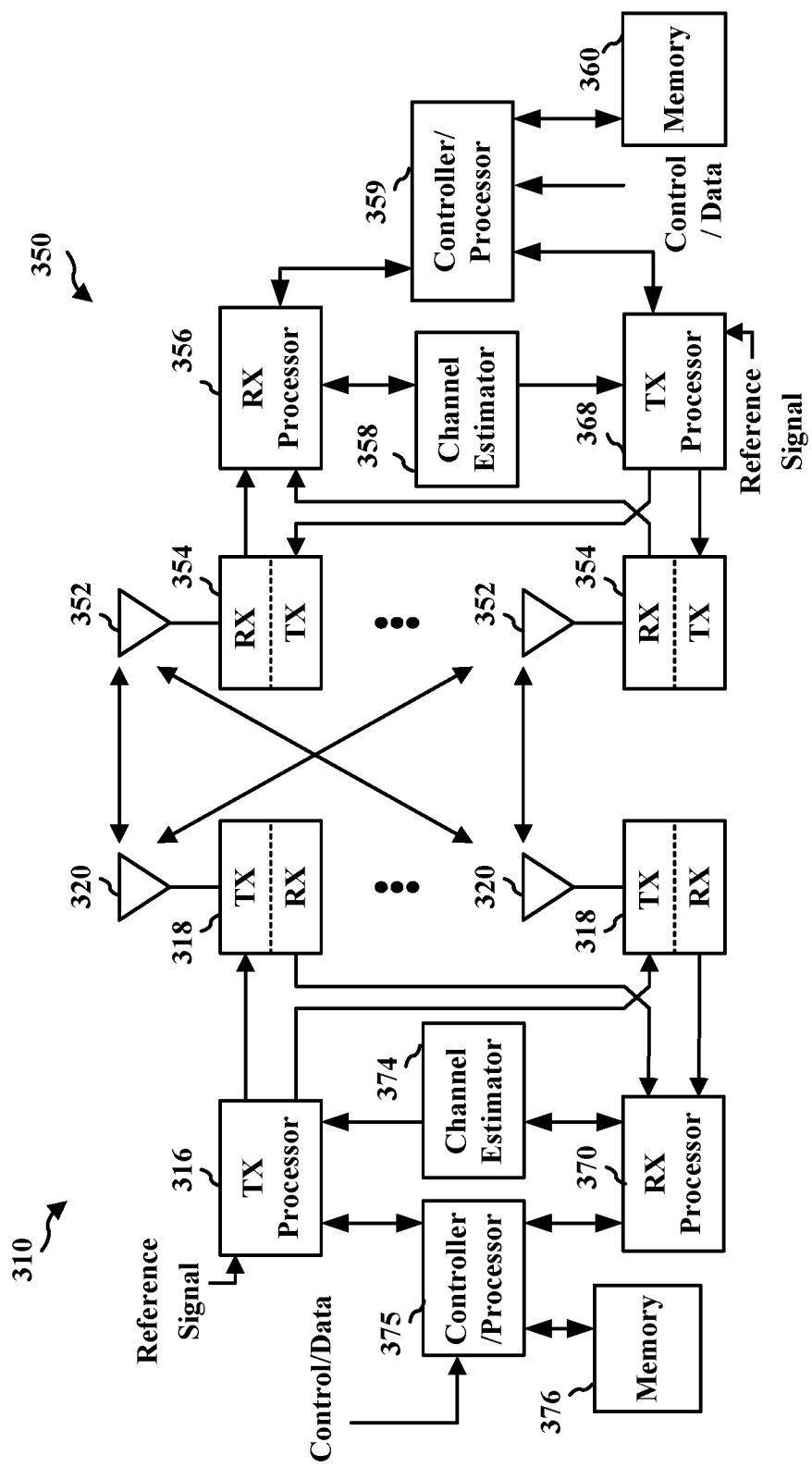
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE

350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium which may store computer executable code for wireless communication of a user equipment (UE), the code when executed by a processor (e.g., one or more of RX processor 356, TX processor 368, and/or controller/processor 359) instructs the processor to perform aspects of FIGS. 9, 10, and/or 11. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium which may store computer executable code for wireless communication of a base station, the code when executed by a processor (e.g., one or more of RX processor 370, TX processor 316, and/or controller/processor 375) instructs the processor to perform aspects of FIGS. 9, 10, and/or 11. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless systems can utilize a demodulation reference signal (DMRS) in order to help a receiver perform channel estimation and/or use an estimated channel to perform demodulation. In some aspects, the DMRS and data may be transmitted at a transmitter. Also, the receiver can be based on channel estimation followed by coherent demodulation or decoding. Moreover, coherent transmission can mean that a DMRS is transmitted with a payload, and on the receiver side the receiver can utilize the DMRS for decoding. In some aspects, DMRS-based communication may be sub-optimal at a low signal-to-noise ratio (SNR). For instance, energy spent on a DMRS may not contain any useful information. Also, a channel estimation quality may be poor at a low SNR, which can result in significant performance degradation in demodulation or decoding. Further, at a low SNR, non-coherent transmission without sending a DMRS may be an improvement over coherent transmission.

In some aspects, non-orthogonal sequences can transmit a PUCCH in a non-coherent fashion. For instance, non-coherent transmission can refer to transmitting a UCI payload without a DMRS, so the receiver can decode based on the payload and not the DMRS. This design can be utilized with a median UCI payload, e.g., an 8-bit to 40-bit payload. Additionally, orthogonal sequences can transmit a PUCCH in non-coherent fashion, i.e., transmit a UCI payload without a DMRS. The design can be utilized with a small payload, e.g., a 1-bit to 7-bit payload. Some aspects of wireless communication may also utilize sequences with non-coherent transmission.

During sequence transmission, a codebook can be constructed, e.g., a codebook with $2^{10}$ sequences or approximately 1,000 sequences. Based on the payload, a UE can select one sequence out of the codebook, e.g., $2^{10}$ sequences, and then transmit this sequence. On the receiver side, the receiver or base station can determine which sequence was transmitted. So the receiver can utilize the codebook and perform a correlation between the received sequence and the sequences in the codebook. The receiver can then determine which sequence has the largest correlation, such that it can determine the sequence that is identified or transmitted. Also, the number of bits that is carried with the sequence can be a logarithmic, e.g., log 1000.

Sequence-based transmission can utilize orthogonal or non-orthogonal sequences to transmit the payload. Orthogonal sequences may be more suitable to small payloads, as the number of bits that can be transmitted may be equal to log $2^n$, where n is the amount of resources that can transmit the payload. For example, in a resource block (RB) of 168 resource elements (REs), a UE can transmit a sequence of length 168. The UE can then construct the codebook size of at most 168 sequences. So the UE may not construct a codebook of more than n orthogonal sequences. Also, the number of bits transmitted using an orthogonal sequence may be bounded by the overall resources that can be used for the PUCCH transmission. Based on this, the number of payloads that can be transmitted with the orthogonal sequence may be limited.

For non-orthogonal sequences, a limit on the number of sequences may be more relaxed. For instance, with n REs, there can be more than n sequences constructed that are non-orthogonal to one another. So the UE can transmit more UCI bits with non-orthogonal sequences. Accordingly, non-orthogonal sequences may be more suitable to larger payloads. However, non-orthogonal sequences may include degraded detection performance at the receiver side. For instance, the sequences are non-orthogonal to one another, so there may be some interference. So orthogonal sequences may limit the amount of payload that can be transmitted, but the detection performance may be higher compared to non-orthogonal sequences.

For a sequence-based PUCCH, the UE and base station can exhibit a variety of different behaviors. On the UE Tx side, given an assigned PUCCH resource (a time and frequency grid, e.g., a RB), K bits of UCI payload can be transmitted based on a number of factors. So a time and frequency grid can be assigned to the PUCCH, e.g., using N OFDM symbols and M frequency tones. In some instances, the UE can utilize this resource to transmit K bits of UCI payload.

In some instances, the UE can generate an orthogonal matrix of size N*M based on a DFT(n) matrix * sequence S (with cyclic shift index m), where * is the Kronecker product, n=[0, 1, . . . , N−1], and m=[0, 1, . . . , M−1]. Also, N can be the number of OFDM symbols and M can be the number of tones. S can be a cell specific low peak-to-average power ratio (PAPR) sequence with length M. So the length of sequence S may correspond to the number of frequency tones. Also, as a DFT matrix can be a size (n), the size of the DFT matrix may correspond to the number of OFDM symbols. So the Kronecker product of a DFT(n) matrix and sequence S may result in an orthogonal matrix of size N*M.

After determining the orthogonal matrix, the UE can construct a codebook with size $2^K$ based on the orthogonal matrix. The size of the codebook can be $2^K$ as the UE may transmit K bits, so the UE may use $2^K$ sequences or $2^K$ entries in the codebook. So the UE can select $2^K$ rows or $2^K$ columns in the codebook. Next, the UE can transmit a payload of K bits, e.g., $b_0 b_1 b_2 \ldots b_{K-1}$. The UE can convert the payload bit steam $b_0 b_1 b_2 \ldots b_{K-1}$ into a decimal number k, and then transmit the $k^{th}$ codepoint in the constructed codebook. Moreover, the payload bit steam $b_0 b_1 b_2 \ldots b_{K-1}$ can be a binary number, where the binary number is converted into a decimal number k. The UE can then transmit the $k^{th}$ entry or codepoint in the codebook.

On the base station Rx side, the base station can receive the signals, e.g., signal y, on the PUCCH resource (a time*frequency grid, e.g., a RB). Next, the base station can concatenate signal y into a M*N length vector. For example, the base station can concatenate the frequency and then the time, such as by concatenating the length of each M frequency tone for each OFDM symbol. The base station can then perform a vector correlation or inner product of y with each of the sequences in the codebook. So the base station can correlate y with each of the sequences in the codebook. The base station can then determine that the sequence generating the largest correlation with y is the transmitted sequence. Also, the base station can convert the k index into the bit stream.

Aspects of wireless communication can also generate a size N*M orthogonal matrix.

For instance, an orthogonal matrix can be generated by calculating the Kronecker product of a DFT matrix with a base sequence S with a cyclic shift. DFT(n) can be the $n^{th}$ row or column drawn from the size N DFT matrix. Sequence S (with cyclic shift index m) can be the frequency domain base sequence S with cyclic shift m in time domain, or equivalently with phase ramp $e^{j2\pi lm/M}$ or $e^{-j2\pi lm/M}$ on each $l^{th}$ tone. So sequence S with cyclic shift m in time domain may be equal to a phase ramp with slope –$j2\pi lm/M$ or $j2\pi lm/M$. The tone index=l and m=[0, 1, . . . , M−1].

FIGS. 4A and 4B displays DFT matrix 400 and frequency domain base sequence 450, respectively, in accordance with one or more techniques of the present disclosure. As shown in FIG. 4A, DFT matrix 400 includes N rows and N columns (a matrix of N×N). As shown in FIG. 4B, frequency domain base sequence 450, i.e., sequence S, includes a length of M. In some instances, $w = e^{j2\pi/N}$ or $e^{-j2\pi/N}$. In order to produce an orthogonal matrix, the Kronecker product of DFT matrix 400 and frequency domain base sequence 450 can be calculated.

Figure 5:
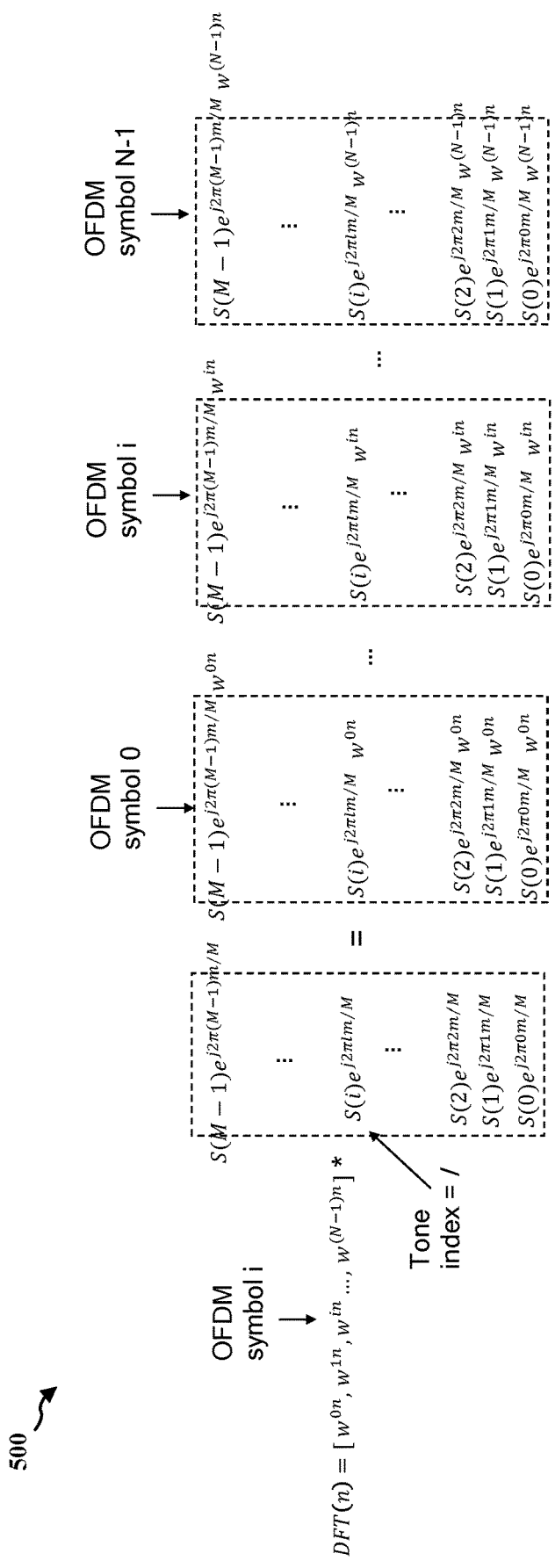
FIG. 5 is an example orthogonal matrix in accordance with one or more techniques of the present disclosure.

FIG. 5 displays orthogonal matrix 500 in accordance with one or more techniques of the present disclosure. More specifically, FIG. 5 displays the Kronecker product of DFT matrix (N)*sequence S (with cyclic shift index m). As shown in FIG. 5, this Kronecker product can produce the N*M orthogonal matrix. This matrix can be of size (M×N)×(M×N) with M×N rows and M×N columns. Also, as will be indicated herein, $2^K$ rows or columns can then be selected from the N*M orthogonal matrix to build a size $2^K$ codebook.

Figure 6:
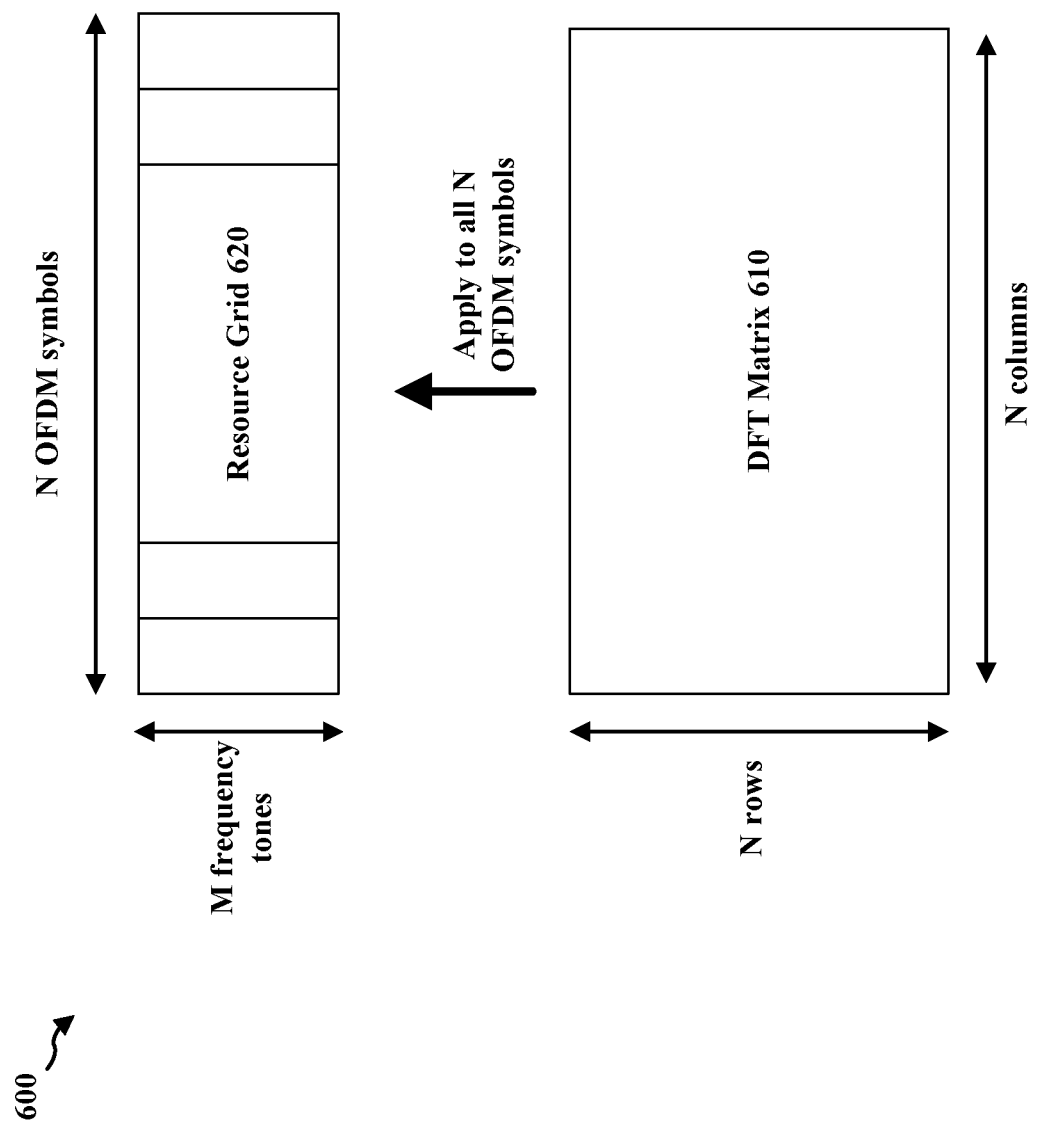
FIG. 6 is an example diagram including a DFT matrix and resource grid in accordance with one or more techniques of the present disclosure.

FIG. 6 displays diagram 600 including DFT matrix 610 and resource grid 620 in accordance with one or more techniques of the present disclosure. As shown in FIG. 6, diagram 600 utilizes one matrix, e.g., DFT matrix 610, and one corresponding codebook. So size N DFT matrix 610 can be used to construct the codebook. Also, this can apply to each of the N OFDM symbols. The time and frequency resource grid, resource grid 620, may be assigned to the PUCCH without frequency hopping.

Frequency hopping can introduce some diversity to a wireless transmission, such as by including multiple frequency hops. In some aspects, if a transmission on a first frequency hop experiences interference, a transmission on a second frequency hop may experience reduced interference, so there may be a better chance of the transmission being received. In some instances, the network or base station can enable or disable the frequency hopping, e.g., via RRC signaling. The network or base station can also control the distance between the frequency hops, e.g., a separation of 50 RBs or 100 RBs.

In some instances, frequency hopping can destroy the orthogonality of a codebook. The constructed codebook can be orthogonal based on the assumption that a channel is constant across all OFDM symbols of the PUCCH transmission. So in general, frequency hopping can destroy the orthogonality of a matrix. The reason that a size N DFT matrix may not be orthogonal is the channel may change across N OFDM symbols. For example, suppose N=4, with frequency hopping some DFT vectors may not be orthogonal from the receiver point of view. For instance, the following two DFT vectors may not be orthogonal: a DFT vector in codepoint 0 of [1, 1, 1, 1] and a DFT vector in codepoint 1 of [1, j, −1, −j] on channel h. So these can be two rows in the DFT matrix. Also, h may be the channel from the transmitter to the receiver. If codepoint 0 is transmitted by the UE, the received signal at the base station may be [h, h, h, h]. So the received signal can be equal to the transmitted signal [1, 1, 1, 1] multiplied by the channel h. When the base station is correlating with codepoint 1, the output can be: h*1+h*j+h*(−1)+h*(−j)=0. So codepoint 0 and 1 may be orthogonal from the receiver perspective. As mentioned above, orthogonality means that for any two codepoints the correlation is 0, so the receiver can determine which codepoint is transmitted. Based on this, the receiver can determine that codepoint 0 is transmitted.

In some aspects, with frequency hopping, the orthogonality of a codebook can be destroyed. For instance, if there is frequency hopping between the channels, multiple channels, e.g., channel h1 and channel h2, can be on different frequencies. For example, a DFT vector in codepoint 0 of [1, 1, 1, 1] and a DFT vector in codepoint 1 of [1, j, −1, −j] on channels h1 and h2. If codepoint 0 is transmitted, the received signal can be [h1, h1, h2, h2]. When correlating with codepoint 1, the output can be: h1*1+h1*j+h2*(−1)+h2*(−j), which is not equal to 0. As such, codepoint 0 and 1 are not orthogonal from the receiver perspective (due to the frequency hopping).

As indicated above, orthogonality means that for any two codepoints the correlation is 0, so the receiver can determine which codepoint is transmitted. However, as frequency hopping can destroy the orthogonality of a codebook, a receiver may not be able to determine which codepoint is transmitted with frequency hopping. Some aspects of wireless communications can preserve the orthogonality of codebooks or sequences with frequency hopping. For instance, aspects of wireless communications can utilize two smaller DFT matrices, e.g., matrices of size N/2, to construct two smaller codebooks. Also, the PUCCH in each frequency hop can use each of the smaller codebooks. As such, orthogonality can be preserved within each frequency hop with the smaller codebook. Further, the DFT matrix can correspond to the time domain orthogonality, which can be maintained with multiple codebooks.

There are a number of advantages to using two smaller codebooks. At least one advantage is that orthogonality may be preserved at least within each of the two smaller codebooks. On the receiver side, orthogonality can be preserved within each hop for the smaller codebooks. Also, a larger concatenated codebook may not be an orthogonal codebook. So with frequency hopping there may be two smaller codebooks. And without frequency hopping there may be a larger codebook. This may result in a non-unified codebook both with and without frequency hopping. Based on the above, it may be beneficial to use a unified codebook both with and without frequency hopping.

Aspects of the present disclosure can utilize a unified codebook both with and without frequency hopping. For instance, for an even-numbered N (the number of OFDM symbols in a PUCCH), the present disclosure can use a unified codebook both with and without frequency hopping. So aspects of the present disclosure can utilize a special design, for even N, to ensure frequency hopping does not destroy codebook orthogonality. Aspects of the present disclosure can use a size N DFT matrix, e.g., with or without frequency hopping, and generate a size M×N orthogonal matrix. This can result in orthogonality both with and without frequency hopping. So there may be no need to use multiple size N/2 DFT matrices to construct two codebooks separately.

Aspects of the present disclosure can use even-numbered rows or columns in the size N DFT matrix to build the codebook. So the present disclosure can select rows or columns from the orthogonal matrix to construct the codebook. Aspects of the present disclosure can use an even number for both startIndex (a function that identifies the row to utilize for the first row in the codebook) and stepSize (a function that identifies the distance between the selected rows), to select $2^{K1}$ rows or columns from the DFT matrix to build a codebook. The network or base station can signal the startIndex and stepSize, which can be even numbers. Orthogonality can still be preserved within each frequency hop when frequency hopping is enabled.

Figure 7:
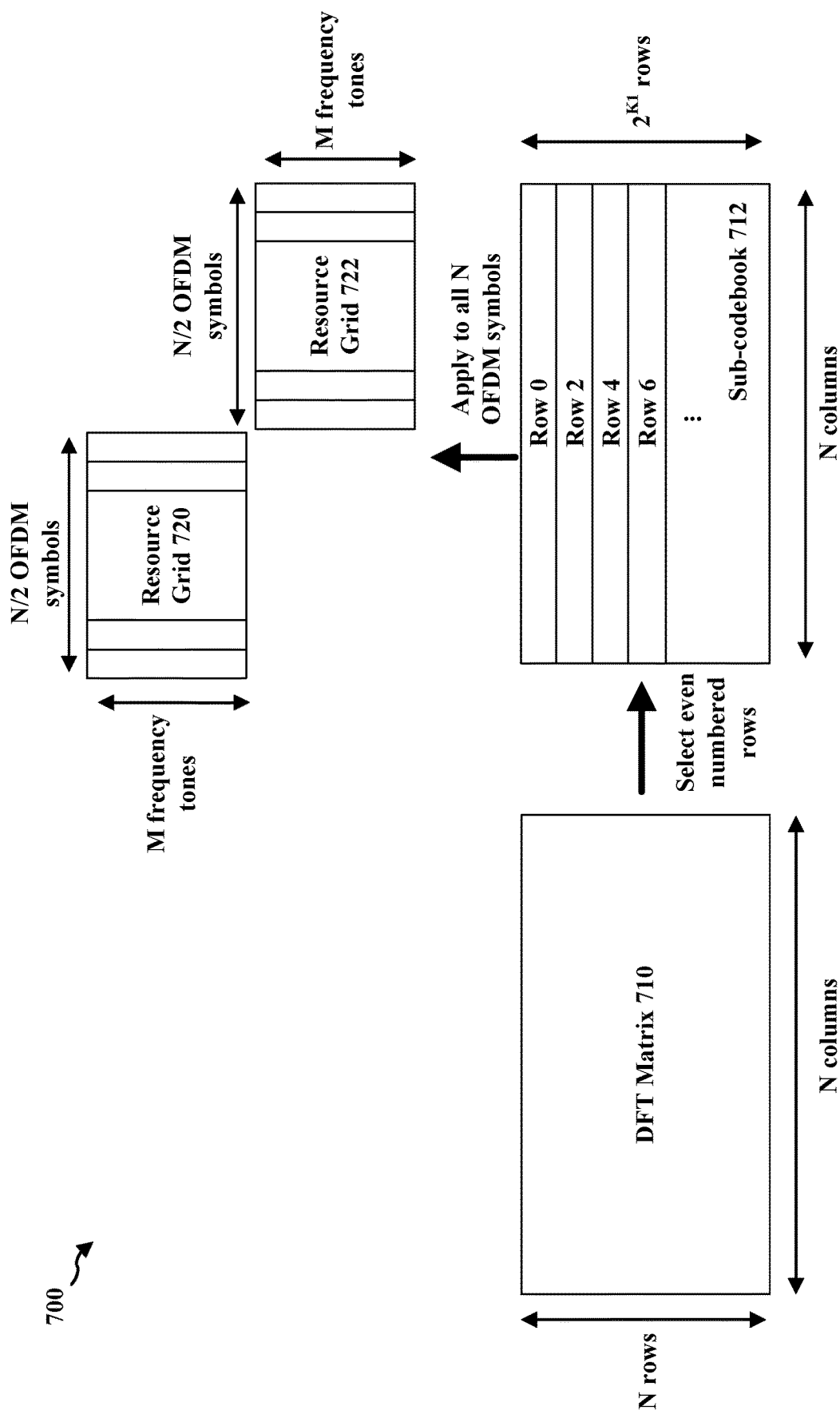
FIG. 7 is an example diagram including a DFT matrix, a codebook, and resource grids in accordance with one or more techniques of the present disclosure.

FIG. 7 displays diagram 700 including a DFT matrix, a codebook, and multiple resource grids in accordance with one or more techniques of the present disclosure. As shown in FIG. 7, diagram 700 includes DFT matrix 710, sub-codebook 712, resource grid 720, and resource grid 722. As shown in FIG. 7, DFT matrix 710 includes N rows and N columns. Further, sub-codebook 712 includes $2^{K1}$ rows and N columns. Also, resource grid 720 and resource grid 722 include N/2 OFDM symbols and M frequency tones.

As shown in FIG. 7, aspects of the present disclosure can use even-numbered rows or columns in size N DFT matrix 710. For instance, the present disclosure can select even-numbered rows or columns, e.g., $2^{K1}$ even-numbered rows, from DFT matrix 710 in order to build sub-codebook 712. So the unified sub-codebook 712 can be generated based on the size N DFT matrix 710, but even-numbered rows or columns may be selected. By doing so, orthogonality can be preserved. The sub-codebook 712 can then be applied to all OFDM symbols in resource grid 720 and resource grid 722.

Selecting even-numbered rows from a size N matrix can be mathematically equivalent to using two N/2 smaller matrices. So even-numbered rows in a larger size N matrix may be equivalent to using all of the rows in two smaller N/2 matrices. As shown in FIG. 7, aspects of the present disclosure can select $2^{K1}$ rows or columns with indices [startIndex: stepSize: stepSize*$(2^{K1}-1)$], where stepSize is an even number, e.g., 2a, and startIndex is also an even number, e.g., 2b.

In some aspects, the present disclosure can use the codebook generated based on an even-numbered starting index and an even-numbered distance or offset. Without frequency hopping, the codebook can be orthogonal across N OFDM symbols. With frequency hopping, the codebook can be orthogonal across a first N/2 OFDM symbols (in a first frequency hop) and orthogonal across a second N/2 OFDM symbols (in a second frequency hop). A receiver may run two smaller correlators in order to maintain orthogonality across all N OFDM symbols (as channel non-continuity may break the orthogonality across multiple hops).

Figure 8:
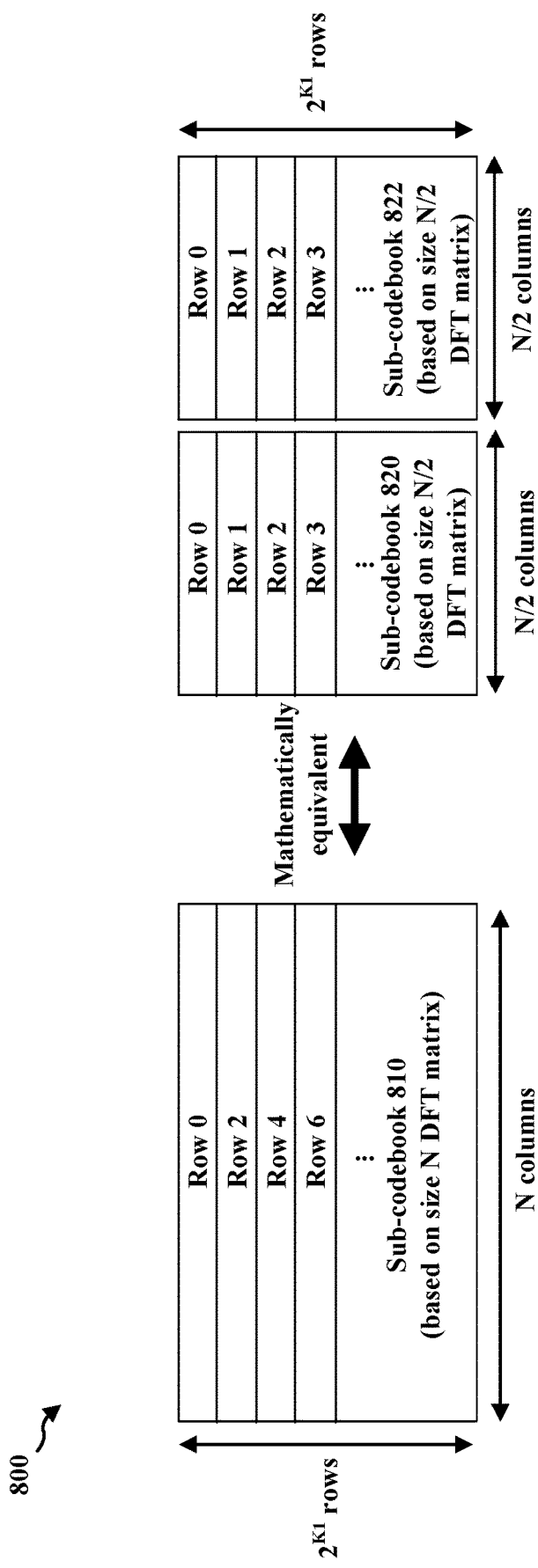
FIG. 8 is an example diagram including codebooks in accordance with one or more techniques of the present disclosure.

FIG. 8 displays diagram 800 including sub-codebook 810, sub-codebook 820, and sub-codebook 822 in accordance with one or more techniques of the present disclosure. As shown in FIG. 8, sub-codebook 810 can include N columns and be based on a size N DFT matrix. Also, sub-codebook 820 and sub-codebook 822 may each include N/2 columns and may each be based on a size N/2 matrix. Further, sub-codebook 810, sub-codebook 820, and sub-codebook 822 can include $2^{K1}$ rows.

As shown in FIG. 8, using even-numbered rows for sub-codebook 810 based on a size N DFT matrix can be mathematically equivalent to using sub-codebooks 820 and 822 based on two size N/2 matrices. For instance, aspects of the present disclosure can select $2^{K1}$ even rows or columns from a DFT matrix to build a sub-codebook 810. This can be mathematically equivalent to selecting each row or column from two N/2 smaller DFT matrices. So using rows 0, 2, 4, 6 in sub-codebook 810 can be equivalent to using rows 0, 1, 2, 3 in sub-codebooks 820 and 822. As such, the size of the codebook 810 can be based on a size N DFT matrix, but the rows utilized for selection may be cut in half, as is the amount of codepoints utilized. So there may be half the amount of possible codepoints from sub-codebook 810 as other codebooks that are based on a size N matrix. Also, the selection of $2^{K1}$ even rows or columns can occur from the DFT matrix, so the Kronecker product can still be performed to create the orthogonal matrix. So the size of the DFT matrix can be halved in order to select the even-numbered rows or columns.

In the case of an odd numbered N (number of symbols), the last transmitted symbol may be empty. For example, if N=3, then the network or base station can configure the 3 symbols, but the UE can transmit using 2 symbols and the last symbol can be empty. Accordingly, for an odd N, the UE may utilize (N−1) symbols during the transmission. Additionally, in some aspects, a codebook may be generated based on a DFT matrix, e.g., a size 14 DFT matrix, by selecting four indices [0, 4, 8, 12] to transmit two bits in the time domain. Another two bits can be delivered using a cyclic shift. As such, one codebook with a DFT size 14 with indices [0, 4, 8, 12] may be equivalent to 2 codebooks with DFT size 7 with indices [0, 2, 4, 6].

Figure 9:
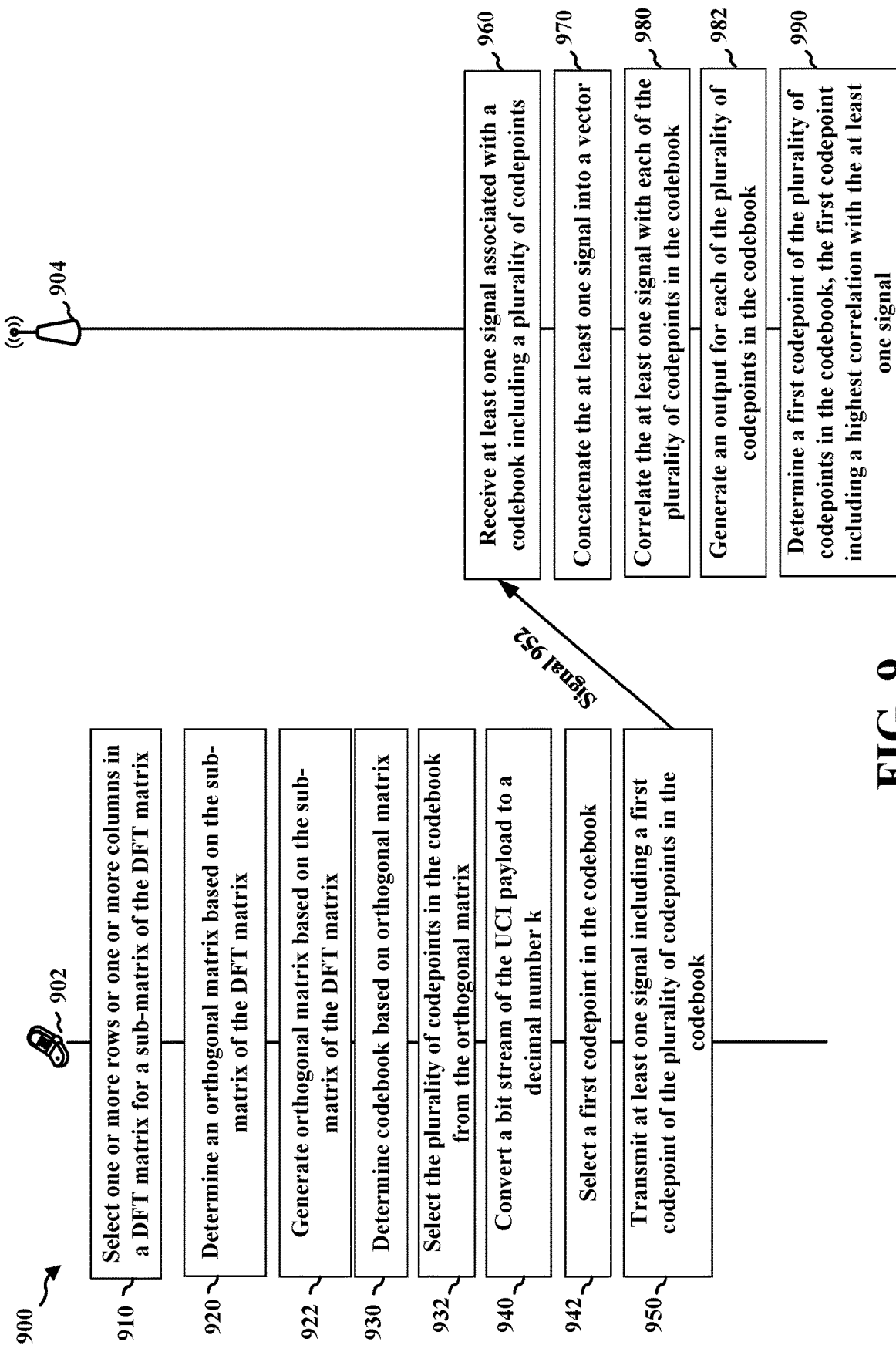
FIG. 9 is a diagram illustrating example communication between a UE and a base station in accordance with one or more techniques of the present disclosure.

FIG. 9 is a diagram 900 illustrating example communication between a UE 902 and a base station 904. At 910, the UE 902 (e.g., using controller/processor 359, memory 360, TX processor 368, and/or the like) may select one or more rows of a plurality of rows or one or more columns of a plurality of columns in a discrete Fourier transform (DFT) matrix for a sub-matrix of the DFT matrix, where the one or more rows may be even-numbered rows in the DFT matrix and the one or more columns may be even-numbered columns in the DFT matrix. In some aspects, the DFT matrix may have a size of N×N with N rows and N columns.

At 920, the UE 902 may determine an orthogonal matrix based on the sub-matrix of the DFT matrix, e.g., the one or more rows or the one or more columns in the DFT matrix. The orthogonal matrix may have a size of (M×N)×(M×N) with M×N rows and M×N columns. In some aspects, the orthogonal matrix may be determined via a Kronecker product of the one or more rows or the one or more columns in the DFT matrix and a frequency domain base sequence, the one or more rows or the one or more columns corresponding to the sub-matrix, where the frequency domain base sequence may include a length M sequence and a cyclic shift m.

At 922, the UE 902 may generate the orthogonal matrix based on the sub-matrix of the DFT matrix, e.g., the one or more rows or one or more columns in the DFT matrix.

At 930, the UE 902 may determine a codebook based on the orthogonal matrix, where the codebook may include a plurality of codepoints.

At 932, the UE 902 may select the plurality of codepoints in the codebook from the orthogonal matrix. In some aspects, the plurality of codepoints in the codebook may correspond to a number of rows or columns in the orthogonal matrix, where the number of rows or columns in the orthogonal matrix may be equal to $2^K$. Additionally, the plurality of codepoints in the codebook may correspond to a plurality of sequences. In some aspects, the codebook may have a size of $2^K \times (M \times N)$ with $2^K$ rows and M×N columns. Moreover, K can be a number of bits in an uplink control information (UCI) payload transmitted by the UE in a physical uplink control channel (PUCCH) resource.

At 940, the UE 902 may convert a bit stream of the UCI payload to a decimal number k.

At 942, the UE 902 may select the first codepoint in the codebook, where the first codepoint may be equal to the $k^{th}$ codepoint in the codebook.

In some aspects, N may be a number of orthogonal frequency division multiplexing (OFDM) symbols associated with the at least one signal, where N is an even integer. Also, N may be a number of OFDM symbols associated with the at least one signal, where N is an odd integer. Further, a last symbol of the number of OFDM symbols may be empty.

At 950, the UE 902 may transmit at least one signal, e.g., signal 952, including a first codepoint of the plurality of codepoints in the codebook to convey a K bit payload in an uplink resource. In some aspects, the at least one signal, e.g., signal 952, may be transmitted with frequency hopping or without frequency hopping. Additionally, the at least one signal, e.g., signal 952, may be transmitted on a physical uplink control channel (PUCCH).

At 960, the base station 904 (e.g., using antenna(s) 320, receiver 318RX, RX processor 370, controller/processor 375, memory 376, and/or the like) may receive the at least one signal, e.g., signal 952, where the at least one signal may be associated with a codebook including a plurality of codepoints. In some aspects, the at least one signal, e.g., signal 952, may be received with frequency hopping or without frequency hopping. Moreover, the at least one signal, e.g., signal 952, can be received on a physical uplink control channel (PUCCH).

In some aspects, the plurality of codepoints in the codebook may correspond to a plurality of sequences. Also, the codebook may have a size of $2^K \times (M \times N)$ with $2^K$ rows and M×N columns. Further, K can be a number of bits in an uplink control information (UCI) payload received by the base station in a physical uplink control channel (PUCCH) resource.

At 970, the base station 904 may concatenate the at least one signal, e.g., signal 952, into a vector. In some aspects, the at least one signal, e.g., signal 952, may correspond to a grid.

At 980, the base station 904 may correlate the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix.

At 982, the base station 904 may generate an output for each of the plurality of codepoints in the codebook.

At 990, the base station 904 may determine a first codepoint of the plurality of codepoints in the codebook, where the first codepoint may include a highest correlation with the at least one signal, e.g., signal 952. In some aspects, the determination of the first codepoint in the codebook may be based on a non-coherent energy combination of the output for each of the plurality of codepoints in the codebook.

Figure 10:
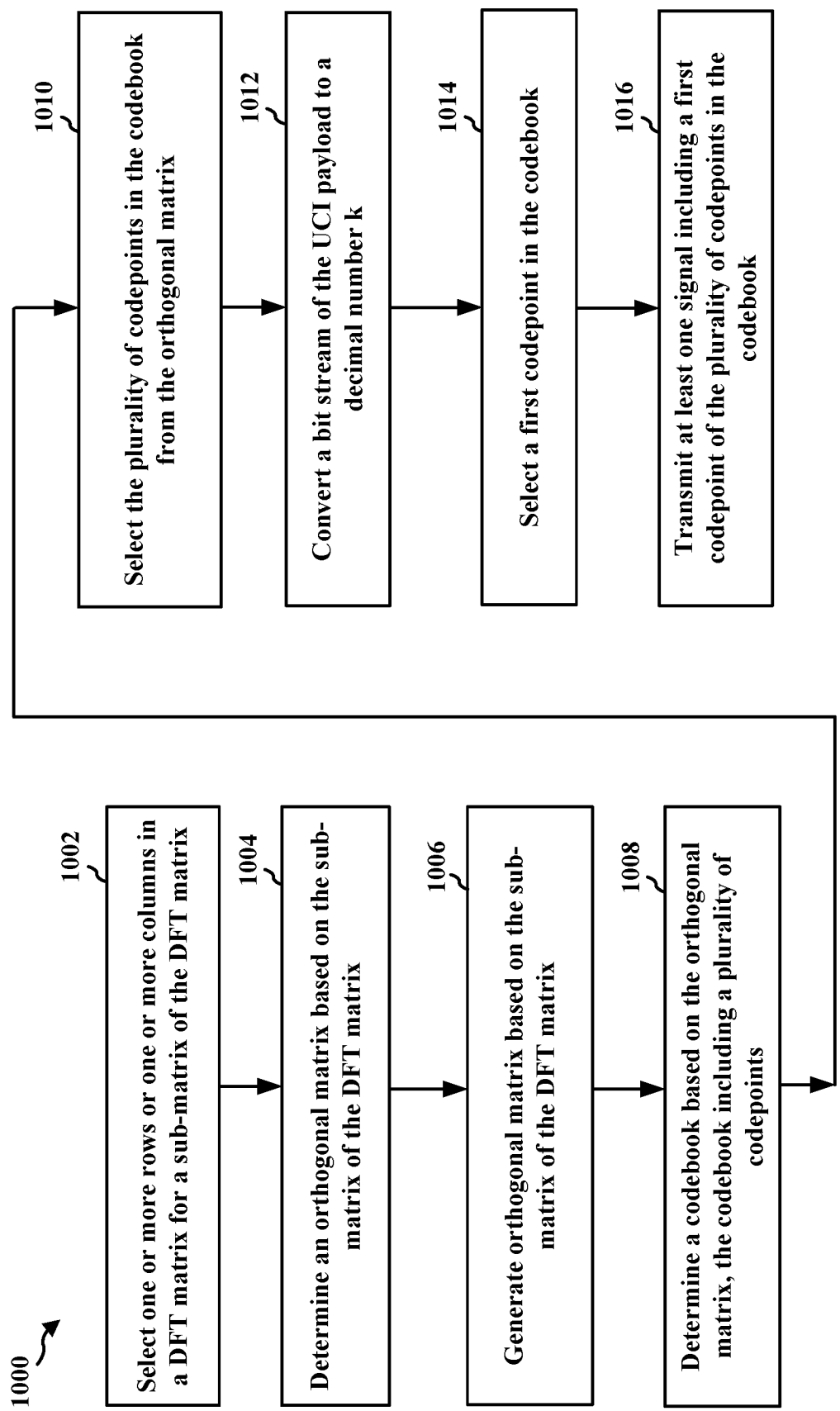
FIG. 10 is a flowchart of a method of wireless communication.

FIG. 10 is a flowchart 1000 of a method of wireless communication. The method may be performed by a UE or a component of a UE (e.g., the UE 104, 350, 902; apparatus 1202; a processing system, which may include the memory 360 and which may be the entire UE or a component of the UE, such as the TX processor 368, the controller/processor 359, transmitter 354TX, antenna(s) 352, and/or the like). The methods described herein can provide a number of benefits, such as improving communication signaling, resource utilization, and/or power savings.

At 1002, the apparatus may select one or more rows of a plurality of rows or one or more columns of a plurality of columns in a discrete Fourier transform (DFT) matrix for a sub-matrix of the DFT matrix, where the one or more rows may be even-numbered rows in the DFT matrix and the one or more columns may be even-numbered columns in the DFT matrix, as described in connection with the examples in FIGS. 4A, 4B, 5, 6, 7, 8, and 9. For example, UE 902 may select one or more rows of a plurality of rows or one or more columns of a plurality of columns in a discrete Fourier transform (DFT) matrix for a sub-matrix of the DFT matrix, where the one or more rows may be even-numbered rows in the DFT matrix and the one or more columns may be even-numbered columns in the DFT matrix, as described in connection with 910 in FIG. 9. Further, 1002 may be performed by determination component 1240 in FIG. 12. In some aspects, the DFT matrix may have a size of N×N with N rows and N columns, as described in connection with the examples in FIGS. 4A, 4B, 5, 6, 7, 8, and 9.

At 1004, the apparatus may determine an orthogonal matrix based on the sub-matrix of the DFT matrix, e.g., the one or more rows or the one or more columns in the DFT matrix, as described in connection with the examples in FIGS. 4A, 4B, 5, 6, 7, 8, and 9. For example, UE 902 may determine an orthogonal matrix based on the sub-matrix of the DFT matrix, e.g., the one or more rows or the one or more columns in the DFT matrix, as described in connection with 920 in FIG. 9. Further, 1004 may be performed by determination component 1240 in FIG. 12. The orthogonal matrix may have a size of (M×N)×(M×N) with M×N rows and M×N columns, as described in connection with the examples in FIGS. 4A, 4B, 5, 6, 7, 8, and 9. In some aspects, the orthogonal matrix may be determined via a Kronecker product of the one or more rows or the one or more columns in the DFT matrix and a frequency domain base sequence, the one or more rows or the one or more columns corresponding to the sub-matrix, where the frequency domain base sequence may include a length M sequence and a cyclic shift m, as described in connection with the examples in FIGS. 4A, 4B, 5, 6, 7, 8, and 9.

At 1006, the apparatus may generate the orthogonal matrix based on the sub-matrix of the DFT matrix, e.g., the one or more rows or one or more columns in the DFT matrix, as described in connection with the examples in FIGS. 4A, 4B, 5, 6, 7, 8, and 9. For example, UE 902 may generate the orthogonal matrix based on the one or more rows or one or more columns in the DFT matrix, as described in connection with 922 in FIG. 9. Further, 1006 may be performed by determination component 1240 in FIG. 12.

At 1008, the apparatus may determine a codebook based on the orthogonal matrix, where the codebook may include a plurality of codepoints, as described in connection with the examples in FIGS. 4A, 4B, 5, 6, 7, 8, and 9. For example, UE 902 may determine a codebook based on the orthogonal matrix, where the codebook may include a plurality of codepoints, as described in connection with 930 in FIG. 9. Further, 1008 may be performed by determination component 1240 in FIG. 12.

At 1010, the apparatus may select the plurality of codepoints in the codebook from the orthogonal matrix, as described in connection with the examples in FIGS. 4A, 4B, 5, 6, 7, 8, and 9. For example, UE 902 may select the plurality of codepoints in the codebook from the orthogonal matrix, as described in connection with 932 in FIG. 9. Further, 1010 may be performed by determination component 1240 in FIG. 12. In some aspects, the plurality of codepoints in the codebook may correspond to a number of rows or columns in the orthogonal matrix, where the number of rows or columns in the orthogonal matrix may be equal to $2^K$, as described in connection with the examples in FIGS. 4A, 4B, 5, 6, 7, 8, and 9. Additionally, the plurality of codepoints in the codebook may correspond to a plurality of sequences, as described in connection with the examples in FIGS. 4A, 4B, 5, 6, 7, 8, and 9.

In some aspects, the codebook may have a size of $2^K \times$ (M×N) with $2^K$ rows and M×N columns, as described in connection with the examples in FIGS. 4A, 4B, 5, 6, 7, 8, and 9. Moreover, K can be a number of bits in an uplink control information (UCI) payload transmitted by the UE in a physical uplink control channel (PUCCH) resource, as described in connection with the examples in FIGS. 4A, 4B, 5, 6, 7, 8, and 9.

At 1012, the apparatus may convert a bit stream of the UCI payload to a decimal number k, as described in connection with the examples in FIGS. 4A, 4B, 5, 6, 7, 8, and 9. For example, UE 902 may convert a bit stream of the UCI payload to a decimal number k, as described in connection with 940 in FIG. 9. Further, 1012 may be performed by determination component 1240 in FIG. 12.

At 1014, the apparatus may select the first codepoint in the codebook, where the first codepoint may be equal to the $k^{th}$ codepoint in the codebook, as described in connection with the examples in FIGS. 4A, 4B, 5, 6, 7, 8, and 9. For example, UE 902 may select the first codepoint in the codebook, where the first codepoint may be equal to the $k^{th}$ codepoint in the codebook, as described in connection with 942 in FIG. 9. Further, 1014 may be performed by determination component 1240 in FIG. 12.

In some aspects, N may be a number of orthogonal frequency division multiplexing (OFDM) symbols associated with the at least one signal, where N is an even integer, as described in connection with the examples in FIGS. 4A, 4B, 5, 6, 7, 8, and 9. Also, N may be a number of OFDM symbols associated with the at least one signal, where N is an odd integer, as described in connection with the examples in FIGS. 4A, 4B, 5, 6, 7, 8, and 9. Further, a last symbol of the number of OFDM symbols may be empty, as described in connection with the examples in FIGS. 4A, 4B, 5, 6, 7, 8, and 9.

At 1016, the apparatus may transmit at least one signal including a first codepoint of the plurality of codepoints in the codebook to convey a K bit payload in an uplink resource, as described in connection with the examples in FIGS. 4A, 4B, 5, 6, 7, 8, and 9. For example, UE 902 may transmit at least one signal including a first codepoint of the plurality of codepoints in the codebook to convey a K bit payload in an uplink resource, as described in connection with 950 in FIG. 9. Further, 1016 may be performed by determination component 1240 in FIG. 12. In some aspects, the at least one signal may be transmitted with frequency hopping or without frequency hopping, as described in connection with the examples in FIGS. 4A, 4B, 5, 6, 7, 8, and 9. Additionally, the at least one signal may be transmitted on a physical uplink control channel (PUCCH), as described in connection with the examples in FIGS. 4A, 4B, 5, 6, 7, 8, and 9.

Figure 11:
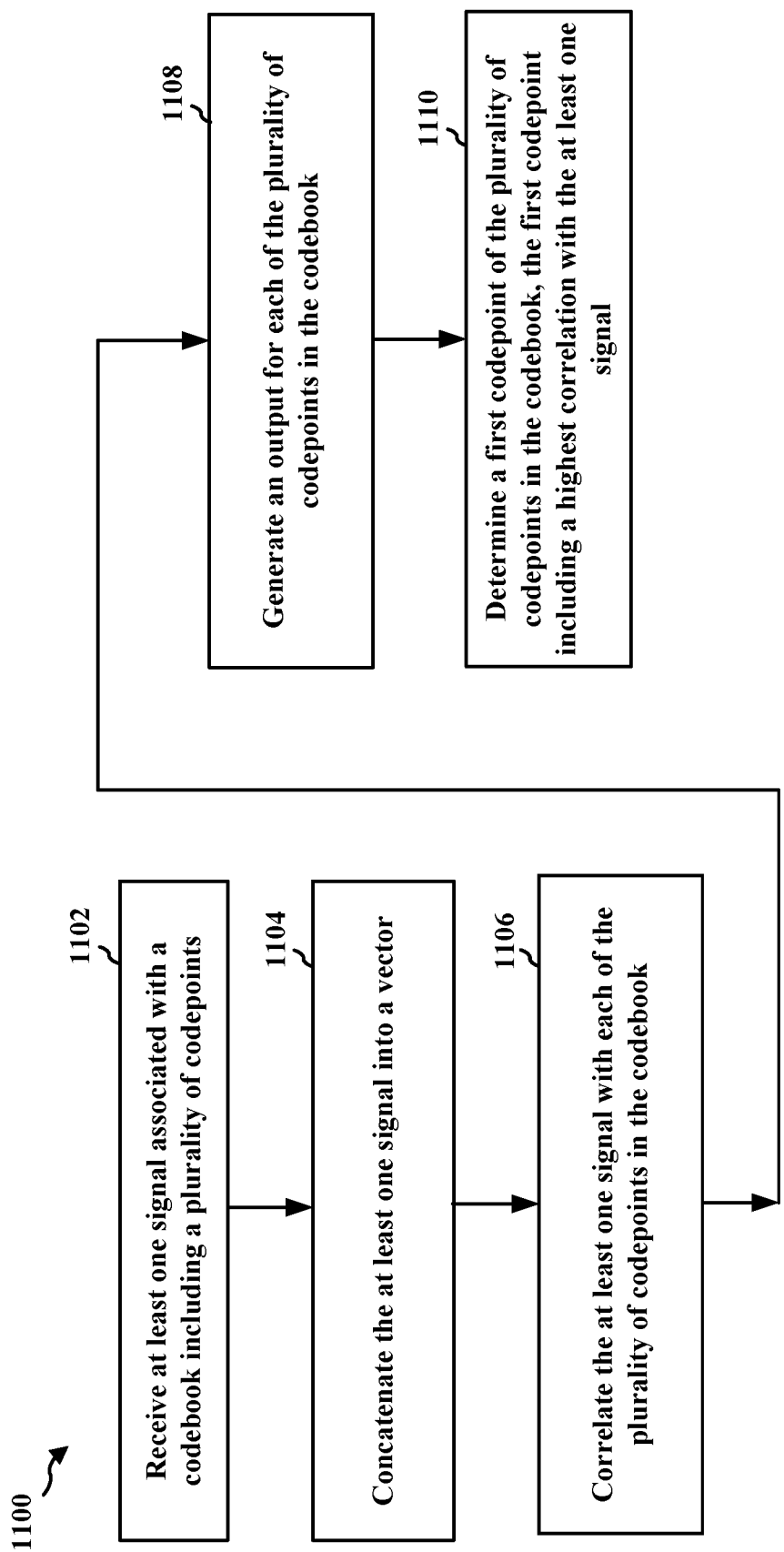
FIG. 11 is a flowchart of a method of wireless communication.

FIG. 11 is a flowchart 1100 of a method of wireless communication. The method may be performed by a base station or a component of a base station (e.g., the base station 102, 180, 310, 904; apparatus 1302; a processing system, which may include the memory 376 and which may be the entire base station or a component of the base station, such as the antenna(s) 320, receiver 318RX, the RX processor 370, the controller/processor 375, and/or the like). The methods described herein can provide a number of benefits, such as improving communication signaling, resource utilization, and/or power savings.

At 1102, the apparatus may receive at least one signal to convey a K bit payload in an uplink resource, the at least one signal associated with a codebook including a plurality of codepoints, as described in connection with the examples in FIGS. 4A, 4B, 5, 6, 7, 8, and 9. For example, base station 904 may receive at least one signal to convey a K bit payload in an uplink resource, the at least one signal associated with a codebook including a plurality of codepoints, as described in connection with 960 in FIG. 9. Further, 1102 may be performed by determination component 1340 in FIG. 13. In some aspects, the at least one signal may be received with frequency hopping or without frequency hopping, as described in connection with the examples in FIGS. 4A, 4B, 5, 6, 7, 8, and 9. Moreover, the at least one signal can be received on a physical uplink control channel (PUCCH), as described in connection with the examples in FIGS. 4A, 4B, 5, 6, 7, 8, and 9.

In some aspects, the plurality of codepoints in the codebook may correspond to a plurality of sequences, as described in connection with the examples in FIGS. 4A, 4B, 5, 6, 7, 8, and 9. Also, the codebook may have a size of $2^K \times$ (M×N) with $2^K$ rows and M×N columns, as described in connection with the examples in FIGS. 4A, 4B, 5, 6, 7, 8, and 9. Further, K can be a number of bits in an uplink control information (UCI) payload received by the base station in a physical uplink control channel (PUCCH) resource, as described in connection with the examples in FIGS. 4A, 4B, 5, 6, 7, 8, and 9.

At 1104, the apparatus may concatenate the at least one signal into a vector, as described in connection with the examples in FIGS. 4A, 4B, 5, 6, 7, 8, and 9. For example, base station 904 may concatenate the at least one signal into a vector, as described in connection with 970 in FIG. 9. Further, 1104 may be performed by determination component 1340 in FIG. 13. In some aspects, the at least one signal may correspond to a grid, as described in connection with the examples in FIGS. 4A, 4B, 5, 6, 7, 8, and 9.

At 1106, the apparatus may correlate the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix, as described in connection with the examples in FIGS. 4A, 4B, 5, 6, 7, 8, and 9. For example, base station 904 may correlate the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix, as described in connection with 980 in FIG. 9. Further, 1106 may be performed by determination component 1340 in FIG. 13.

At 1108, the apparatus may generate an output for each of the plurality of codepoints in the codebook, as described in connection with the examples in FIGS. 4A, 4B, 5, 6, 7, 8, and 9. For example, base station 904 may generate an output for each of the plurality of codepoints in the codebook, as described in connection with 982 in FIG. 9. Further, 1108 may be performed by determination component 1340 in FIG. 13.

At 1110, the apparatus may determine a first codepoint of the plurality of codepoints in the codebook, the first codepoint including a highest correlation with the at least one signal, as described in connection with the examples in FIGS. 4A, 4B, 5, 6, 7, 8, and 9. For example, base station 904 may determine a first codepoint of the plurality of codepoints in the codebook, the first codepoint including a highest correlation with the at least one signal, as described in connection with 990 in FIG. 9. Further, 1110 may be performed by determination component 1340 in FIG. 13. In some aspects, the determination of the first codepoint in the codebook may be based on a non-coherent energy combination of the output for each of the plurality of codepoints in the codebook, as described in connection with the examples in FIGS. 4A, 4B, 5, 6, 7, 8, and 9.

Figure 12:
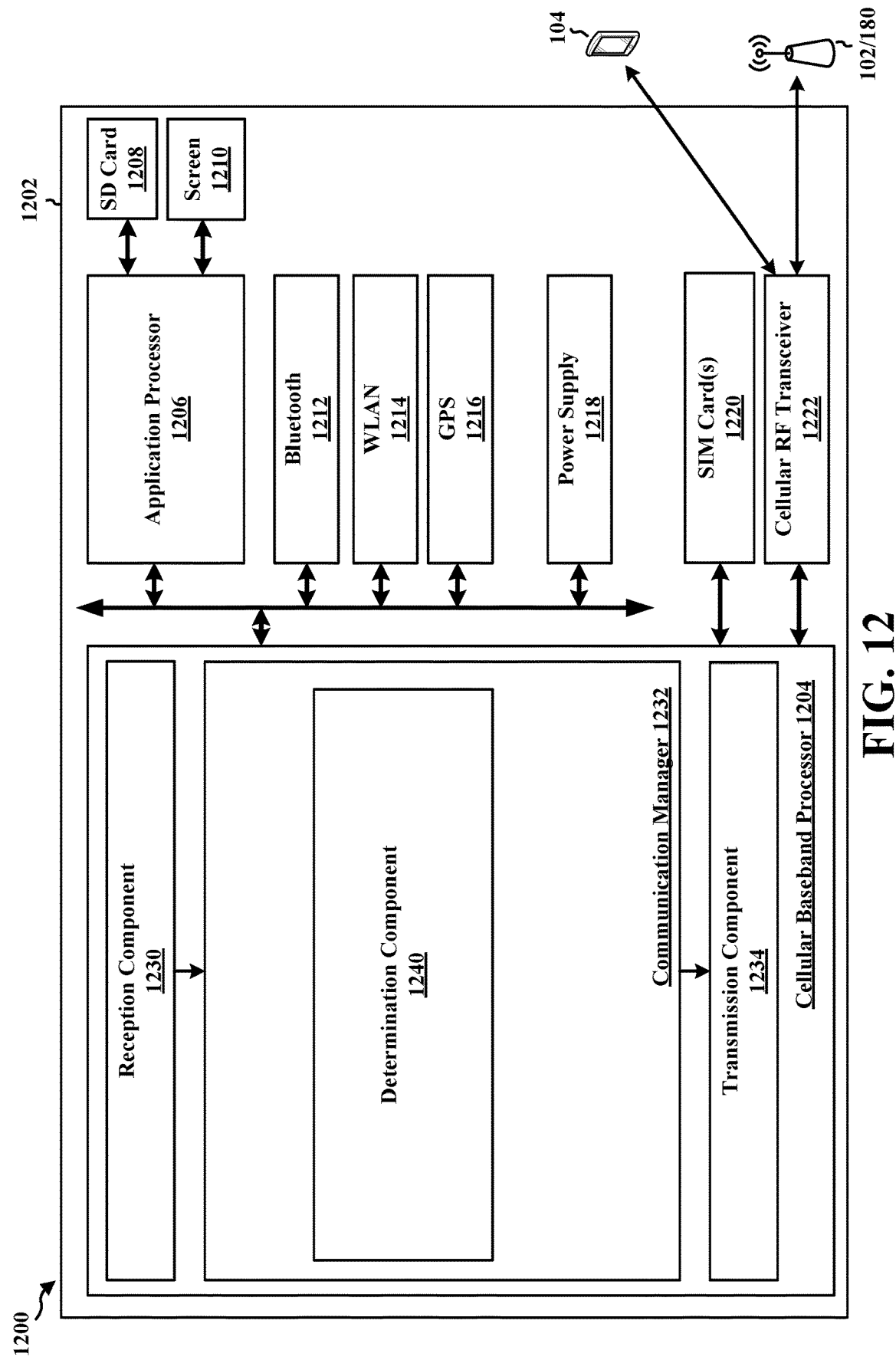
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured to select one or more rows of a plurality of rows or one or more columns of a plurality of columns in a discrete Fourier transform (DFT) matrix for a sub-matrix of the DFT matrix, the one or more rows being even-numbered rows in the DFT matrix and the one or more columns being even-numbered columns in the DFT matrix, e.g., as described in connection with step 1002 in FIG. 10. Determination component 1240 may be further configured to determine an orthogonal matrix based on the sub-matrix of the DFT matrix, e.g., the one or more rows or the one or more columns in the DFT matrix, e.g., as described in connection with step 1004 in FIG. 10. Determination component 1240 may be further configured to generate the orthogonal matrix based on the sub-matrix of the DFT matrix, e.g., the one or more rows or one or more columns in the DFT matrix, e.g., as described in connection with step 1006 in FIG. 10. Determination component 1240 may be further configured to determine a codebook based on the orthogonal matrix, the codebook including a plurality of codepoints, e.g., as described in connection with step 1008 in FIG. 10. Determination component 1240 may be further configured to select the plurality of codepoints in the codebook from the orthogonal matrix, e.g., as described in connection with step 1010 in FIG. 10. Determination component 1240 may be further configured to convert a bit stream of the UCI payload to a decimal number k, e.g., as described in connection with step 1012 in FIG. 10. Determination component 1240 may be further configured to select the first codepoint in the codebook, where the first codepoint is equal to a $k^{th}$ codepoint in the codebook, e.g., as described in connection with step 1014 in FIG. 10. Determination component 1240 may be further configured to transmit at least one signal including a first codepoint of the plurality of codepoints in the codebook to convey a K bit payload in an uplink resource, e.g., as described in connection with step 1016 in FIG. 10.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for selecting one or more rows of a plurality of rows or one or more columns of a plurality of columns in a discrete Fourier transform (DFT) matrix for a sub-matrix of the DFT matrix, the one or more rows being even-numbered rows in the DFT matrix and the one or more columns being even-numbered columns in the DFT matrix; means for determining an orthogonal matrix based on the one or more rows or the one or more columns in the DFT matrix; means for generating the orthogonal matrix based on the one or more rows or one or more columns in the DFT matrix; means for determining a codebook based on the orthogonal matrix, the codebook including a plurality of codepoints; means for selecting the plurality of codepoints in the codebook from the orthogonal matrix; means for converting a bit stream of the UCI payload to a decimal number k; means for selecting the first codepoint in the codebook, where the first codepoint is equal to a $k^{th}$ codepoint in the codebook; and means for transmitting at least one signal including a first codepoint of the plurality of codepoints in the codebook to convey a K bit payload in an uplink resource. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
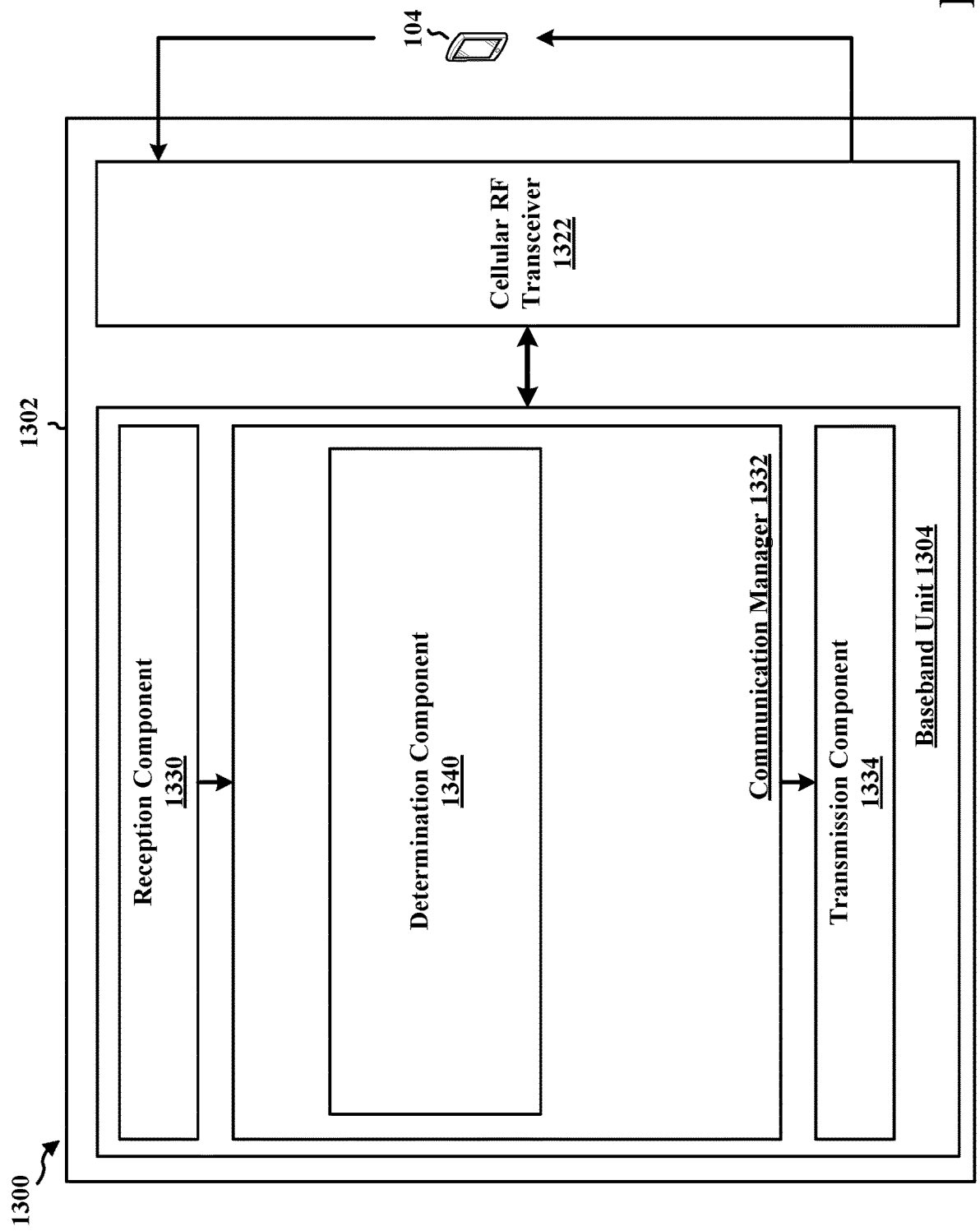
FIG. 13 is a diagram illustrating an example of a hardware implementation for an example apparatus.

FIG. 13 is a diagram 1300 illustrating an example of a hardware implementation for an apparatus 1302. The apparatus 1302 is a base station (BS) and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a determination component 1340 that is configured to receive at least one signal to convey a K bit payload in an uplink resource, the at least one signal associated with a codebook including a plurality of codepoints, e.g., as described in connection with step 1102 in FIG. 11. Determination component 1340 may be further configured to concatenate the at least one signal into a vector, e.g., as described in connection with step 1104 in FIG. 11. Determination component 1340 may be further configured to correlate the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix, e.g., as described in connection with step 1106 in FIG. 11. Determination component 1340 may be further configured to generate an output for each of the plurality of codepoints in the codebook, e.g., as described in connection with step 1108 in FIG. 11. Determination component 1340 may be further configured to determine a first codepoint of the plurality of codepoints in the codebook, the first codepoint including a highest correlation with the at least one signal, e.g., as described in connection with step 1110 in FIG. 11.

The apparatus may include additional components that perform each of the blocks of the algorithm in the aforementioned flowcharts of FIGS. 9 and 11. As such, each block in the aforementioned flowcharts of FIGS. 9 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving at least one signal to convey a K bit payload in an uplink resource, the at least one signal associated with a codebook including a plurality of codepoints; means for concatenating the at least one signal into a vector; means for correlating the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix; means for generating an output for each of the plurality of codepoints in the codebook; and means for determining a first codepoint of the plurality of codepoints in the codebook, the first codepoint including a highest correlation with the at least one signal. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE). The method includes selecting one or more rows of a plurality of rows or one or more columns of a plurality of columns in a discrete Fourier transform (DFT) matrix for a sub-matrix of the DFT matrix, the one or more rows being even-numbered rows in the DFT matrix and the one or more columns being even-numbered columns in the DFT matrix; determining an orthogonal matrix based on the sub-matrix of the DFT matrix, e.g., the one or more rows or the one or more columns in the DFT matrix; determining a codebook based on the orthogonal matrix, the codebook including a plurality of codepoints; and transmitting at least one signal including a first codepoint of the plurality of codepoints in the codebook to convey a K bit payload in an uplink resource.

Aspect 2 is the method of aspect 1, where the DFT matrix has a size of N×N with N rows and N columns and the orthogonal matrix has a size of (M×N)×(M×N) with M×N rows and M×N columns.

Aspect 3 is the method of any of aspects 1 and 2, further including generating the orthogonal matrix based on the sub-matrix of the DFT matrix, e.g., the one or more rows or one or more columns in the DFT matrix.

Aspect 4 is the method of any of aspects 1 to 3, where the orthogonal matrix is determined via a Kronecker product of the one or more rows or the one or more columns in the DFT matrix and a frequency domain base sequence, the one or more rows or the one or more columns corresponding to the sub-matrix, the frequency domain base sequence including a length M sequence and a cyclic shift m.

Aspect 5 is the method of any of aspects 1 to 4, further including selecting the plurality of codepoints in the codebook from the orthogonal matrix.

Aspect 6 is the method of any of aspects 1 to 5, where the plurality of codepoints in the codebook correspond to a number of rows or columns in the orthogonal matrix, the number of rows or columns in the orthogonal matrix being equal to $2^K$, where the plurality of codepoints in the codebook correspond to a plurality of sequences.

Aspect 7 is the method of any of aspects 1 to 6, where the codebook has a size of $2^K \times$ (M×N) with $2^K$ rows and M×N columns, where K is a number of bits in an uplink control information (UCI) payload transmitted by the UE in a physical uplink control channel (PUCCH) resource.

Aspect 8 is the method of any of aspects 1 to 7, further including converting a bit stream of the UCI payload to a decimal number k.

Aspect 9 is the method of any of aspects 1 to 8, further including selecting the first codepoint in the codebook, where the first codepoint is equal to a $k^{th}$ codepoint in the codebook.

Aspect 10 is the method of any of aspects 1 to 9, where N is a number of orthogonal frequency division multiplexing (OFDM) symbols associated with the at least one signal, where N is an even integer.

Aspect 11 is the method of any of aspects 1 to 10, where N is a number of orthogonal frequency division multiplexing (OFDM) symbols associated with the at least one signal, where N is an odd integer, where a last symbol of the number of OFDM symbols is empty.

Aspect 12 is the method of any of aspects 1 to 11, where the at least one signal is transmitted with frequency hopping or without frequency hopping.

Aspect 13 is the method of any of aspects 1 to 12, where the at least one signal is transmitted on a physical uplink control channel (PUCCH).

Aspect 14 is an apparatus for wireless communication including means for implementing a method as in any of aspects 1 to 13.

Aspect 15 is an apparatus for wireless communication including at least one processor coupled to a memory and a transceiver and configured to implement a method as in any of aspects 1 to 13.

Aspect 16 is a computer-readable medium storing computer executable code, where the code when executed by a processor causes the processor to implement a method as in any of aspects 1 to 13.

Aspect 17 is a method of wireless communication at a base station. The method includes receiving at least one signal to convey a K bit payload in an uplink resource, the at least one signal associated with a codebook including a plurality of codepoints; correlating the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix; and determining a first codepoint of the plurality of codepoints in the codebook, the first codepoint including a highest correlation with the at least one signal.

Aspect 18 is the method of aspect 17, further including concatenating the at least one signal into a vector.

Aspect 19 is the method of any of aspects 17 to 18, where the at least one signal corresponds to a grid.

Aspect 20 is the method of any of aspects 17 to 19, further including generating an output for each of the plurality of codepoints in the codebook.

Aspect 21 is the method of any of aspects 17 to 20, where the determination of the first codepoint in the codebook is based on a non-coherent energy combination of the output for each of the plurality of codepoints in the codebook.

Aspect 22 is the method of any of aspects 17 to 21, where the plurality of codepoints in the codebook correspond to a plurality of sequences.

Aspect 23 is the method of any of aspects 17 to 22, where the codebook has a size of $2^K \times (M \times N)$ with $2^K$ rows and M×N columns.

Aspect 24 is the method of any of aspects 17 to 23, where K is a number of bits in an uplink control information (UCI) payload received by the base station in a physical uplink control channel (PUCCH) resource.

Aspect 25 is the method of any of aspects 17 to 24, where the at least one signal is received with frequency hopping or without frequency hopping.

Aspect 26 is the method of any of aspects 17 to 25, where the at least one signal is received on a physical uplink control channel (PUCCH).

Aspect 27 is an apparatus for wireless communication including means for implementing a method as in any of aspects 17 to 26.

Aspect 28 is an apparatus for wireless communication including at least one processor coupled to a memory and a transceiver and configured to implement a method as in any of aspects 17 to 26.

Aspect 29 is a computer-readable medium storing computer executable code, where the code when executed by a processor causes the processor to implement a method as in any of aspects 17 to 26.

What is claimed is:

1. A method of wireless communication at a user equipment (UE), comprising:
    selecting one or more even-numbered rows of a plurality of rows or one or more even-numbered columns of a plurality of columns in a discrete Fourier transform (DFT) matrix for a sub-matrix of the DFT matrix;
    determining an orthogonal matrix based on the sub-matrix of the DFT matrix;
    determining a codebook based on the orthogonal matrix, the codebook including a plurality of codepoints; and
    transmitting at least one signal including a first codepoint of the plurality of codepoints in the codebook to convey a K bit payload in an uplink resource, where K is a positive integer.

2. The method of claim 1, wherein the DFT matrix has a size of N×N with N rows and N columns and the orthogonal matrix has a size of (M×N)×(M×N) with M×N rows and M×N columns, where M and N are positive integers.

3. The method of claim 2, wherein the codebook has a size of $2^K \times (M \times N)$ with $2^K$ rows and M×N columns, wherein K is a number of bits in an uplink control information (UCI) payload transmitted by the UE in a physical uplink control channel (PUCCH) resource.

4. The method of claim 3, further comprising:
    converting a bit stream of the UCI payload to a positive decimal number k.

5. The method of claim 4, further comprising:
    selecting the first codepoint in the codebook, wherein the first codepoint is equal to a $k^{th}$ codepoint in the codebook.

6. The method of claim 2, wherein N is a number of orthogonal frequency division multiplexing (OFDM) symbols associated with the at least one signal, wherein N is an even integer.

7. The method of claim 2, wherein N is a number of orthogonal frequency division multiplexing (OFDM) symbols associated with the at least one signal, wherein N is an odd integer, wherein a last symbol of the number of OFDM symbols is empty.

8. The method of claim 1, further comprising:
    generating the orthogonal matrix based on the sub-matrix of the DFT matrix.

9. The method of claim 1, wherein the orthogonal matrix is determined via a Kronecker product of the one or more rows or the one or more columns in the DFT matrix and a frequency domain base sequence, the one or more rows or the one or more columns corresponding to the sub-matrix, the frequency domain base sequence including a length M sequence and a cyclic shift m.

10. The method of claim 1, further comprising:
selecting the plurality of codepoints in the codebook from the orthogonal matrix.

11. The method of claim 10, wherein the plurality of codepoints in the codebook correspond to a number of rows or columns in the orthogonal matrix, the number of rows or columns in the orthogonal matrix being equal to $2^K$, wherein the plurality of codepoints in the codebook correspond to a plurality of sequences.

12. The method of claim 1, wherein the at least one signal is transmitted with frequency hopping or without frequency hopping.

13. The method of claim 1, wherein the at least one signal is transmitted on a physical uplink control channel (PUCCH).

14. An apparatus for wireless communication, the apparatus being a user equipment (UE), comprising:
a memory;
a transceiver; and
at least one processor coupled to the memory and the transceiver and configured to:
select one or more even-numbered rows of a plurality of rows or one or more even-numbered columns of a plurality of columns in a discrete Fourier transform (DFT) matrix for a sub-matrix of the DFT matrix;
determine an orthogonal matrix based on the sub-matrix of the DFT matrix;
determine a codebook based on the orthogonal matrix, the codebook including a plurality of codepoints; and
transmit, via the transceiver, at least one signal including a first codepoint of the plurality of codepoints in the codebook to convey a K bit payload in an uplink resource, where K is a positive integer.

15. The apparatus of claim 14, wherein the DFT matrix has a size of N×N with N rows and N columns and the orthogonal matrix has a size of (M×N)×(M×N) with M×N rows and M×N columns, where M and N are positive integers.

16. The apparatus of claim 15, wherein the codebook has a size of $2^K$×(M×N) with $2^K$ rows and M×N columns, wherein K is a number of bits in an uplink control information (UCI) payload transmitted by the UE in a physical uplink control channel (PUCCH) resource.

17. The apparatus of claim 16, wherein the at least one processor is further configured to:
convert a bit stream of the UCI payload to a positive decimal number k; and
select the first codepoint in the codebook, wherein the first codepoint is equal to a $k^{th}$ codepoint in the codebook.

18. The apparatus of claim 14, wherein the at least one processor is further configured to:
generate the orthogonal matrix based on the sub-matrix of the DFT matrix.

19. The apparatus of claim 14, wherein the at least one processor is further configured to:
select the plurality of codepoints in the codebook from the orthogonal matrix, wherein the plurality of codepoints in the codebook correspond to a number of rows or columns in the orthogonal matrix, the number of rows or columns in the orthogonal matrix being equal to $2^K$, wherein the plurality of codepoints in the codebook correspond to a plurality of sequences.

20. A method of wireless communication at a base station, comprising:
receiving at least one signal to convey a K bit payload in an uplink resource, the at least one signal associated with a codebook including a plurality of codepoints, where K is a positive integer;
correlating the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix; and
determining a first codepoint of the plurality of codepoints in the codebook, the first codepoint including a highest correlation with the at least one signal.

21. The method of claim 20, further comprising:
concatenating the at least one signal into a vector.

22. The method of claim 21, wherein the at least one signal corresponds to a grid.

23. The method of claim 20, further comprising:
generating an output for each of the plurality of codepoints in the codebook.

24. The method of claim 23, wherein the determination of the first codepoint in the codebook is based on a non-coherent energy combination of the output for each of the plurality of codepoints in the codebook.

25. The method of claim 20, wherein the plurality of codepoints in the codebook correspond to a plurality of sequences.

26. The method of claim 20, wherein the codebook has a size of $2^K$×(M×N) with $2^K$ rows and M×N columns, where M and N are positive integers.

27. The method of claim 26, wherein K is a number of bits in an uplink control information (UCI) payload received by the base station in a physical uplink control channel (PUCCH) resource.

28. The method of claim 20, wherein the at least one signal is received with frequency hopping or without frequency hopping.

29. The method of claim 20, wherein the at least one signal is received on a physical uplink control channel (PUCCH).

30. An apparatus for wireless communication, the apparatus being a base station, comprising:
a memory;
a transceiver; and
at least one processor coupled to the memory and the transceiver and configured to:
receive, via the transceiver, at least one signal to convey a K bit payload in an uplink resource, the at least one signal associated with a codebook including a plurality of codepoints, where K is a positive integer;
correlate the at least one signal with each of the plurality of codepoints in the codebook, the codebook being associated with a sub-matrix of a discrete Fourier transform (DFT) matrix, the DFT matrix including a plurality of rows and a plurality of columns, the sub-matrix including one or more even-numbered rows in the DFT matrix or one or more even-numbered columns in the DFT matrix; and
determine a first codepoint of the plurality of codepoints in the codebook, the first codepoint including a highest correlation with the at least one signal.

* * * * *